US012248276B2

(12) United States Patent
Di Domenico et al.

(10) Patent No.: US 12,248,276 B2
(45) Date of Patent: Mar. 11, 2025

(54) SHOCK PROTECTION OF A RESONATOR MECHANISM WITH ROTARY FLEXURE BEARING

(71) Applicant: The Swatch Group Research and Development Ltd, Marin (CH)

(72) Inventors: Gianni Di Domenico, Neuchatel (CH); Mohammad Hussein Kahrobaiyan, Neuchatel (CH); Dominique Lechot, Les Reussilles (CH); Pascal Winkler, St-Blaise (CH)

(73) Assignee: The Swatch Group Research and Development Ltd, Marin (CH)

( * ) Notice: Subject to any disclaimer, the term of this patent is extended or adjusted under 35 U.S.C. 154(b) by 446 days.

(21) Appl. No.: 17/812,456

(22) Filed: Jul. 14, 2022

(65) Prior Publication Data

US 2023/0176522 A1 Jun. 8, 2023

(30) Foreign Application Priority Data

Dec. 6, 2021 (EP) .................................... 21212441

(51) Int. Cl.
*G04B 17/04* (2006.01)
*G04B 17/20* (2006.01)

(52) U.S. Cl.
CPC ........... *G04B 17/045* (2013.01); *G04B 17/20* (2013.01)

(58) Field of Classification Search
CPC ...... G04B 17/045; G04B 17/20; G04B 17/28; G04B 17/32; G04B 31/02; G04B 43/002
See application file for complete search history.

(56) References Cited

U.S. PATENT DOCUMENTS 10,216,149 B2 * 2/2019 Winkler ............... G04B 17/045
11,175,630 B2 * 11/2021 Winkler ................... G04C 3/04
2018/0284698 A1 * 10/2018 Cettour-Baron ....... G04B 31/02
2019/0324401 A1 * 10/2019 Winkler ............... G04B 43/002

FOREIGN PATENT DOCUMENTS

EP 3 438 762 A2 2/2019
EP 3 438 762 A3 2/2019
EP 3 561 607 A1 10/2019

OTHER PUBLICATIONS

European Search Report issued May 11, 2022 in European Application 21212441.6 filed on Dec. 6, 2021, 4 pages (with English Translation of Categories of Cited Documents).

* cited by examiner

*Primary Examiner* — Edwin A. Leon
*Assistant Examiner* — Jason M Collins
(74) *Attorney, Agent, or Firm* — Oblon, McClelland, Maier & Neustadt, L.L.P.

(57) ABSTRACT

A horological resonator mechanism, including a structure carrying, via a flexible suspension, an anchor unit from which is suspended an inertial element oscillating about a pivot axis extending in a first direction Z, in a first degree of rotational freedom RZ, under the effect of the return forces of a flexure pivot including longitudinal elastic strips, each fixed to the inertial element and to the anchor unit, the flexible suspension allowing the anchor unit to move in five degrees of freedom, this resonator is a composite assembly made of at least two different materials, on the one hand for the flexure pivot, and on the other hand for the flexible suspension.

20 Claims, 3 Drawing Sheets

SHOCK PROTECTION OF A RESONATOR MECHANISM WITH ROTARY FLEXURE BEARING

CROSS-REFERENCE TO RELATED APPLICATION

This application claims priority to European Patent Application No. 21212441.6 filed on Dec. 6, 2021, the entire disclosure of which is hereby incorporated herein by reference.

FIELD OF THE INVENTION

The invention relates to a horological resonator mechanism comprising a structure and an anchor unit from which is suspended at least one inertial element arranged to oscillate with a first degree of rotational freedom RZ about a pivot axis extending in a first direction Z, said inertial element being subjected to return forces exerted by a flexure pivot comprising a plurality of substantially longitudinal elastic strips, each fixed, at a first end to said anchor unit, and at a second end to said inertial element, each said elastic strip being deformable essentially in a plane XY perpendicular to said first direction Z, the structure carrying this anchor unit by a flexible suspension which allows the anchor unit to move through five degrees of freedom.

The invention further relates to a horological oscillator comprising at least one such resonator mechanism.

The invention further relates to a horological movement comprising at least one such oscillator and/or one such resonator mechanism.

The invention further relates to a watch comprising such a horological movement, and/or such an oscillator, and/or such a resonator mechanism.

The invention relates to the field of horological resonators, and more particularly to those that comprise elastic strips acting as return means for the running of the oscillator and to the shock protection of such mechanisms with flexure bearings.

BACKGROUND OF THE INVENTION

Very good performance is achieved with horological oscillators comprising elastic strips constituting a flexure bearing, and in particular with resonators with crossed strips. The use of a flexure bearing pivot allows the pivot of a balance and its balance spring to be replaced. This has the advantage of eliminating pivot friction and thus increasing the quality factor of the resonator. As the inertial mass, in particular a balance, is suspended from the flexure bearing, usually made of silicon, but not limited thereto, a shock protection device must be provided so that the strips do not break during a fall.

One method for producing this shock protection is presented in the Swiss patent application No. 715526 filed by ETA Manufacture Horlogère Suisse, incorporated herein by reference. A flexible structure (referred to as a shock protection) is inserted between the flexure pivot and the plate, which allows the balance to move in all degrees of freedom (translations along X, Y, Z and rotations about X, Y) except for the rotation about Z of the balance, which is allowed by the flexure pivot, and mechanical stops are added to limit the travel of the balance. In the event of significant impacts, this shock protection allows the balance to be displaced as far as the mechanical stops, while protecting the silicon flexure pivot from breaking. In the event of micro-impacts, the stiffness of the shock protection is high enough to prevent the balance from touching the mechanical stops. In the Swiss patent application No. 715526, the shock protection and the flexure pivot are made of a single monolithic piece of silicon. This has advantages in terms of simplicity of manufacture and assembly. Nonetheless, silicon is a brittle material, so much so that in the event of very violent impacts, the part may break because the maximum stress has been exceeded.

Further improvements to the shock protection of such oscillators are thus necessary, while ensuring the torsional stiffness of the suspension thereof. The impact strength also depends on this torsional stiffness; more specifically, during out-of-plane impacts, the stress to which the strips are subjected quickly reaches very high values, which accordingly reduces the distance the part can travel before breaking. Numerous variations of shock absorbers for timepieces are available. However, the purpose thereof is essentially to protect the fragile pivots of the staff, not the elastic elements, such as the balance spring in a conventional example.

The European patent document No. 3054357A1 filed by ETA Manufacture Horlogère Suisse SA describes a timepiece oscillator comprising a structure and distinct, temporally and geometrically offset, primary resonators, each comprising a mass returned to the structure by an elastic return means. This oscillator comprises coupling means for the interaction of the primary resonators, comprising motor means for driving a wheel set which comprises drive and guide means arranged to drive and guide a control means articulated with transmission means, each articulated, remotely from the control means, with a mass of a primary resonator. The primary resonators and the wheel set are arranged such that the axes of articulation of any two of the primary resonators and the axis of articulation of the control means are never coplanar.

The European patent document No. 3035127A1 filed by SWATCH GROUP RESEARCH & DEVELOPMENT Ltd describes a timepiece oscillator comprising a resonator formed by a tuning fork which comprises at least two mobile oscillating parts, fixed to a connection element by flexible elements whose geometry determines a virtual pivot axis having a determined position with respect to a plate, and about which the respective mobile part oscillates, whose centre of mass is coincident in the rest position with the respective virtual pivot axis.

For at least one mobile part, the flexible elements are formed of intersecting elastic strips extending at a distance from each other in two parallel planes, and whose directions, in projection on one of the parallel planes, intersect at the virtual pivot axis of the mobile part.

New mechanism architectures make it possible to maximise the quality factor of a resonator, by using a flexure bearing with the use of a lever escapement having a very small lift angle, according to the Swiss patent application No. 01544/16 filed by ETA Manufacture Horlogère Suisse and its derivatives, the teachings whereof can be directly used in the present invention, and the resonator whereof can be further improved with regard to its sensitivity to impacts, in some specific directions. The aim is thus to protect the strips from breaking in the event of an impact. It is clear that the shock protection systems proposed thus far for resonators with flexure bearings protect the strips from impacts in certain directions only, and not in all directions, or that they have the drawback of allowing the setting of the flexure pivot to move slightly according to the oscillatory rotation thereof, which should be avoided as much as possible.

The Swiss patent application No. 00518/18 or the European patent application No. 18168765.8 filed by ETA Manufacture Horlogère Suisse describes a timepiece resonator mechanism, comprising a structure carrying, via a flexible suspension, an anchor unit from which is suspended an inertial element oscillating with a first degree of rotational freedom RZ, under the action of return forces exerted by a flexure pivot comprising first elastic strips each fixed to said inertial element and to said anchor unit, the flexible suspension being arranged to allow the anchor unit a certain level of mobility in every degree of freedom except the first degree of rotational freedom RZ wherein only the inertial element can move to avoid any disturbance to its oscillation, and the stiffness of the suspension in the first degree of rotational freedom RZ is very considerably higher than the stiffness of the flexure pivot in this same first degree of rotational freedom RZ.

SUMMARY OF THE INVENTION

The invention is intended to optimise the shock protection of such an oscillator, while ensuring the required torsional stiffnesses of the suspension, in particular for a resonator mechanism according to the Swiss patent No. 00518/18 or the European patent application No. 18168765.8 filed by ETA Manufacture Horlogère Suisse, or for a similar resonator with flexure bearings.

Improving the torsional stiffness of the suspension also improves the protection of the strips against breakage in the event of an impact. A good rotary resonator with flexure bearing, which constitutes a flexure pivot and defines a virtual pivot axis, must be both very flexible for oscillatory rotation in a first degree of rotational freedom RZ, and also very stiff in the other degrees of freedom (X, Y, Z, RX, RY) so as to avoid spurious movements of the centre of mass of the resonator. More specifically, such spurious movements can lead to running errors, if the orientation of the resonator changes in the gravitational field (referred to as a positional error). The suspension of the setting of the pivot must be very stiff in the degree of freedom of the oscillation, so as not to disturb the isochronism of the resonator, and so as not to dissipate energy via movements caused by the reaction forces.

The invention proposes the production of an improved shock protection for an oscillator with flexure bearing, in order to better manage the torsional stiffnesses of the suspension, and consequently to limit the out-of-plane displacement of the strips of a strip resonator, and thus to provide a more resistant system.

For this purpose, the invention relates to a strip resonator mechanism according to claim 1.

The invention further relates to a horological oscillator comprising at least one such resonator mechanism.

The invention further relates to a horological movement comprising at least one such resonator mechanism.

The invention further relates to a watch comprising such a horological movement and/or such a resonator mechanism.

BRIEF DESCRIPTION OF THE DRAWINGS

Other features and advantages of the invention will be better understood upon reading the following detailed description given with reference to the accompanying drawings, in which.

DETAILED DESCRIPTION OF THE PREFERRED EMBODIMENTS

The invention relates to a horological resonator mechanism, which constitutes an alternative to the resonators described in the Swiss patent application No. 00518/18, or in the European patent application No. 18168765.8 filed by ETA Manufacture Horlogère Suisse, or in the Swiss patent application No. 715526 or in the European patent application No. 3561607 filed by ETA Manufacture Horlogère Suisse incorporated herein by reference, a person skilled in the art knowing how to combine the features thereof with those specific to the present invention.

The invention is based on the observation that silicon (or silicon and/or a silicon oxide) is the most suitable material for the flexure pivot, but not for the shock protection. More specifically, in order to fulfil its shock protection role, the structure must be capable of large deformations with high resilience. Some metallic materials are more suitable than silicon for this function. For example, NiP is more suitable than silicon. More specifically, the Young's modulus is 90 GPa for NiP compared to 150 GPa for Si, and the maximum stress is 1,700 MPa for NiP compared to 1,000 MPa for Si. This means that the maximum allowable deformation is three times greater for NiP than for Si.

The invention thus consists of making the pivot out of a first material, in particular silicon or an equivalent, and making the shock protection out of a second material, in particular nickel-phosphorus NiP or an equivalent, this second material having very different physical properties to the first material.

Figure 2:
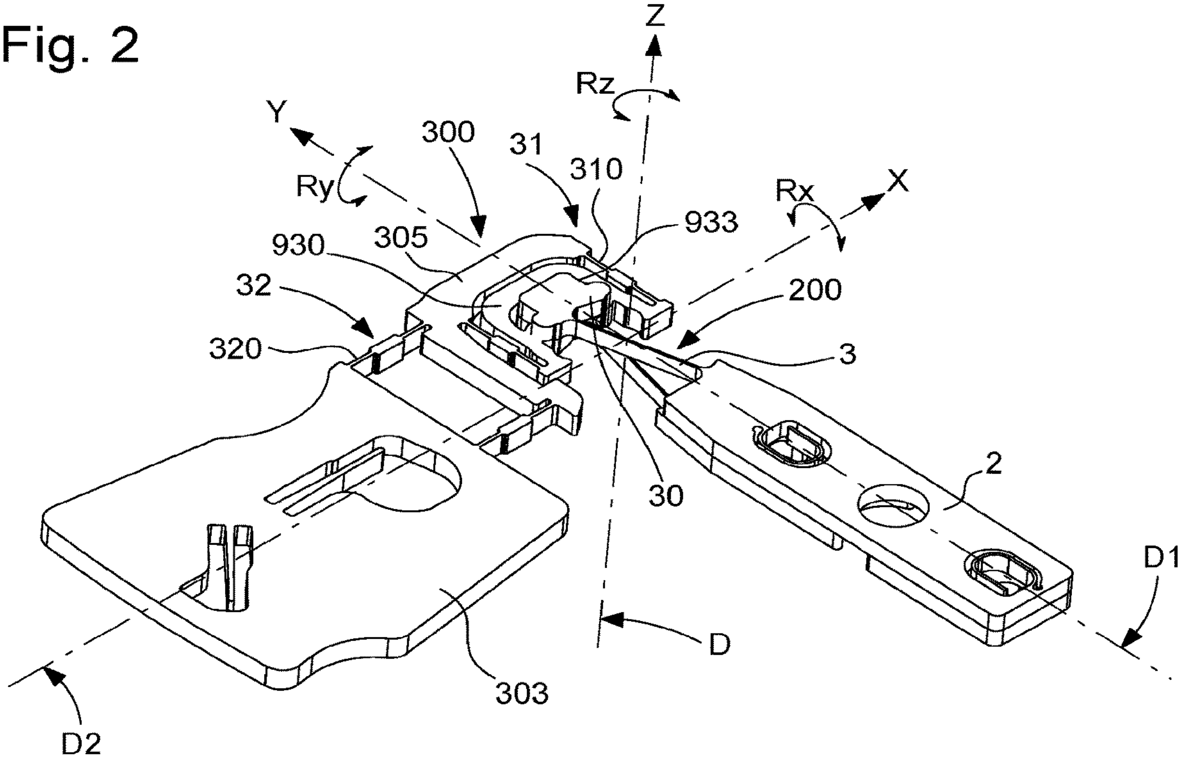
FIG. 2 diagrammatically shows a perspective view of the improvement according to the invention of a resonator mechanism according to FIG. 1; the resonator mechanism, shown after removing the elements for connection to a fixed structure of the watch, is a composite assembly made of at least two different materials, and which comprises, on the one hand, the flexure pivot, which is made of a first material, and, on the other hand, the flexible suspension, which is made of a second material, the flexure pivot being held in an elastic clamp integrated into the flexible suspension.
Figure 3:
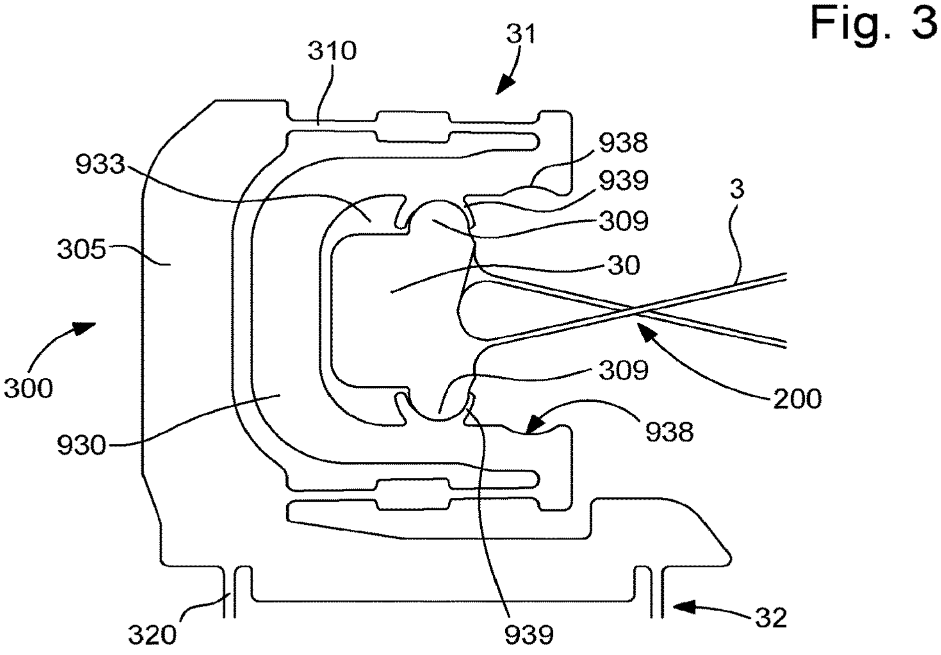
FIG. 3 diagrammatically shows a plan view of a feature of the mechanism according to the invention in FIG. 2, showing the interaction between the elastic clamp of the flexible suspension and the anchor unit of the flexure pivot.

The difficulty lies in assembling the two parts without adding too great a mass at the point of assembly. In order to achieve this, we propose using an elastic assembly system, with or without adhesive. One practical example embodiment is shown in FIGS. 2 and 3.

Figure 1:
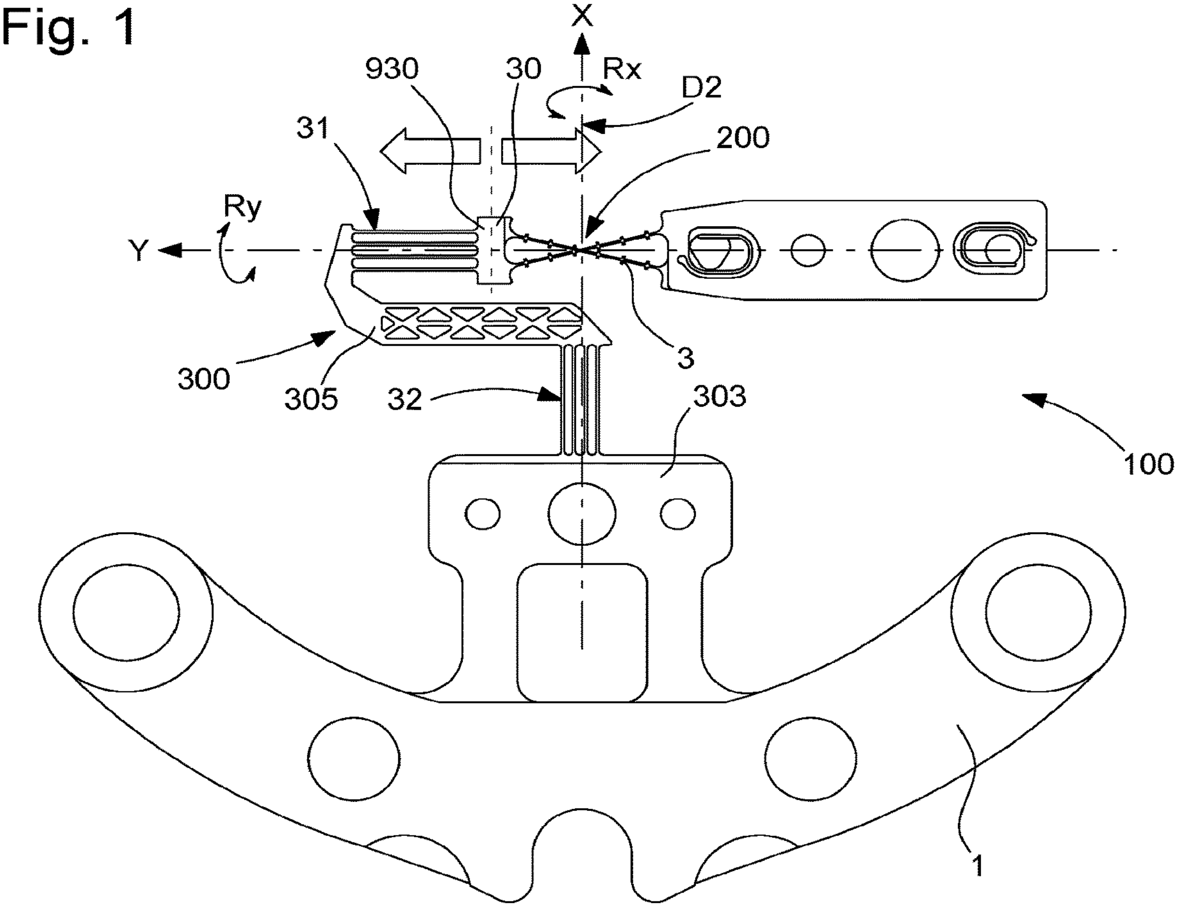
FIG. 1 diagrammatically shows a plan view of a resonator mechanism with elastic strips, comprising an inertial mass suspended from an anchor unit by a flexure pivot comprising two parallel levels of elastic strips, the directions of extension of these strips, in projection, intersecting at a virtual pivot axis of this inertial element, according to the Swiss patent application No. 00518/18 or the European patent application No. 18168765.8 filed by ETA Manufacture Horlogère Suisse, the teachings whereof can be used in the case of the present invention; this resonator mechanism is shown in a particular, non-limiting configuration, wherein it comprises two translation stages arranged to provide restricted freedom to intermediate masses comprised in the resonator between the anchor unit and the attachment to a plate; it can be noted that each of these translation stages comprises longilineal elastic elements whose direction is substantially directed towards the pivot axis at the virtual pivot defined by the elastic strips; the inertial element carries, in this case, an inertial mass in the form of a balance with inertia adjustment screws, and also carries a projecting element, such as a pin or the like, arranged to cooperate with an escapement mechanism not shown, and in particular with a pallet, or even directly with an escapement wheel; this mechanism further comprises upper and lower stops to limit the travel of the inertial mass and to protect the strips of the flexure bearing.

This horological resonator mechanism 100 comprises, as seen in FIG. 1, a structure 1 and an anchor unit 30, from which is suspended at least one inertial element 2 which is arranged to oscillate with a first degree of rotational freedom RZ about a pivot axis D extending in a first direction Z. This inertial element 2 is subjected to return forces exerted by a flexure pivot 200 comprising a plurality of substantially longitudinal elastic strips 3, each fixed at a first end to the anchor unit 30, and at a second end to the inertial element 2. Each elastic strip 3 is deformable essentially in a plane XY perpendicular to the first direction Z.

The anchor unit 30 is suspended from the structure 1 by a flexible suspension 300, which is arranged to allow the anchor unit 30 to move in five flexible degrees of freedom of the suspension which are:

- a first degree of translational freedom in the first direction Z,
- a second degree of translational freedom in a second direction X orthogonal to the first direction Z,
- a third degree of translational freedom in a third direction Y orthogonal to the second direction X and to the first direction Z,
- a second degree of rotational freedom RX about an axis extending in the second direction X,
- and a third degree of rotational freedom RY about an axis extending in the third direction Y.

According to the invention, the resonator mechanism 100 is a composite assembly made of at least two different materials, and which comprises, on the one hand, the flexure pivot 200, which is made of a first material characterised by a first Young's modulus E1 and by a first yield strength Sigma 1 and by a first modulus of rigidity G1, and, on the other hand, the flexible suspension 300, which is made of a second material characterised by a second Young's modulus E2 and by a second yield strength Sigma 2 and by a second modulus of rigidity G2.

The modulus of rigidity is defined here as the rigidity G=K1c^2/E, where K1c is the fracture toughness and E is the Young's modulus. A high rigidity modulus G means that the part is capable of storing more elastic energy before breaking.

More particularly, the value of the second modulus of rigidity G2 is greater than ten times the value of the first modulus of rigidity G1. Also more particularly, the value of the second modulus of rigidity G2 is greater than eighty times the value of the first modulus of rigidity G1. This is the case when the first material is silicon and/or a silicon oxide, and when the second material is NiP, the G2/G1 ratio being close to 100;

More particularly, the ratio Sigma 2/E2 is at least twice the ratio Sigma 1/E1.

More particularly, the value of the first Young's modulus E1 is greater than or equal to 1.5 times the value of the second Young's modulus E2.

More particularly, the value of the second yield strength Sigma 2 is greater than or equal to 1.5 times the value of the first yield strength Sigma 1.

More particularly, at least one inertial element 2 is integral with the flexure pivot 200.

More particularly, the flexible suspension 300 is integral with the structure 1.

More particularly, the flexure pivot 200 is capable of being removed from the flexible suspension 300.

More particularly, the flexible suspension 300 comprises clamping elements, in particular jaws 939, to immobilise the flexure pivot 200. Advantageously, these jaws 939 constitute the gripping elements of an elastic clamp 930. FIG. 3 shows the resting position of this clamp denoted by the reference numeral 938.

More particularly, the flexible suspension 300 comprises at least one pocket 933 which is capable of receiving adhesive to immobilise the flexure pivot 200.

More particularly, the junction between the flexible suspension 300 and the flexure pivot 200 is made on the anchor unit 30, which preferably comprises reliefs 309, the shape whereof is complementary to the profile of the elements 939.

In a specific manner, the clamp 930 is suspended from an intermediate mass 305, which in turn is suspended from the structure 1 or from another intermediate mass 303.

This elastic assembly has the advantage of minimising the added mass.

More particularly, the ratio Sigma 2/E2 is at least three times the ratio Sigma 1/E1.

More particularly, the first material is silicon and/or a silicon oxide.

More particularly, the second material is nickel-phosphorus NiP.

In particular, the modulus of rigidity of silicon is almost 100 times lower than that of all nickel alloys. A combination of the first material, which is silicon and/or a silicon oxide, and the second material, which is nickel-phosphorus NiP, is particularly advantageous for the desired shock protection application and the dissipation (losses) of NiP is greater than that of silicon, which is an additional advantage.

It goes without saying that alloys other than nickel-phosphorus NiP can have a sigma yield strength to Young's modulus E ratio that is sufficiently high to satisfy the conditions of the invention. In this case, the nickel-phosphorus NiP has the major advantage of being able to be precisely shaped using the "LIGA" (Lithography Galvano-Abformung) method, with a perfect geometry and narrow tolerances that are perfectly compatible with horological requirements. For the specific application shown in the figures, the flexible suspension 300 is advantageously, but in a non-limiting manner, made of a nickel-phosphorus NiP plate with a thickness of between 180 and 420 micrometres.

FIG. 3 describes the assembly of the flexure pivot 200 with the flexible suspension 300, and shows the assembly area in detail, and also describes the assembly procedure. The assembly takes place in three stages: firstly, the elastic clamp 930 (in particular made of NiP) is opened so that the anchor unit 30 (in particular made of silicon) can be inserted into the jaws 939; then the clamp 930 is released such that the jaws 939 thereof grip and block the reliefs 309 of the anchor unit 30; finally, only if necessary, adhesive is inserted into at least one pocket 933 between the clamp 930 and the anchor unit 30.

The elastic clamp 930 is designed to provide a high clamping force. It is thus important to ensure that the Hertzian pressure does not exceed the maximum stress at the contact between the jaw 939 and the relief 309 of the silicon anchor unit 30. For this reason, the shape of the jaw 939 closely fits that of the relief 309, so that the difference in the radius of curvature is as small as possible. Giving the jaw 939 some flexibility allows it to deform slightly to accommodate any geometric errors between the clamp 930 and the anchor unit 30.

The pocket 933 provided for the adhesive consists, on the one hand, of at least one wide area where the adhesive can be easily inserted, and on the other hand, of at least one narrower area which helps to distribute the adhesive by capillary action.

The use of the torsional flexibility of a translation stage allows the torsional stiffnesses of the suspension to be better managed. This is achieved by orienting the strips of the XY stages so that the direction of greatest torsional flexibility is towards the axis of rotation of the resonator. The torsional flexibility thereof is managed by moving the strips closer together.

Thus, the flexible suspension 300 advantageously comprises, between the anchor unit 30 and a first intermediate mass 303, which is attached to the structure 1 directly or by means of a plate 301 that is flexible in the first direction Z, a transverse translation stage 32 with flexure bearing, and which comprises transverse strips 320 or transverse flexible rods 1320, which are rectilinear and extend in the second direction X and symmetrically about a transverse axis D2 intersecting the pivot axis D.

In one particular non-limiting embodiment, and as illustrated by the figures, the flexible suspension 300 further comprises, between the anchor unit 30 and a second intermediate mass 305, a longitudinal translation stage 31 with flexure bearing, and which comprises longitudinal strips 310 or longitudinal flexible rods, which are rectilinear and extend in the third direction Y and symmetrically about a longitudinal axis D1 intersecting the pivot axis D. Moreover, between the second intermediate mass 305 and the first intermediate mass 303, the transverse translation stage 32 with flexure bearing comprises transverse strips 320 or transverse flexible rods, which are rectilinear and extend in the second direction X and symmetrically about the transverse axis D2 intersecting the pivot axis D.

More particularly, the longitudinal axis D1 intersects the transverse axis D2, and in particular the longitudinal axis D1, the transverse axis D2, and the pivot axis D are concurrent.

In a more particular manner, the longitudinal translation stage 31 and the transverse translation stage 32 each comprise at least two flexible strips or rods, each strip or rod being characterised by its thickness in the second direction X when the strip or rod extends in the third direction Y or conversely, by its height in the first direction Z and by its length in the direction in which the strip or rod extends, the length being at least five times greater than the height, the height being at least as great as the thickness, and more particularly at least five times greater than this thickness, and even more particularly at least seven times greater than this thickness.

Figure 4:
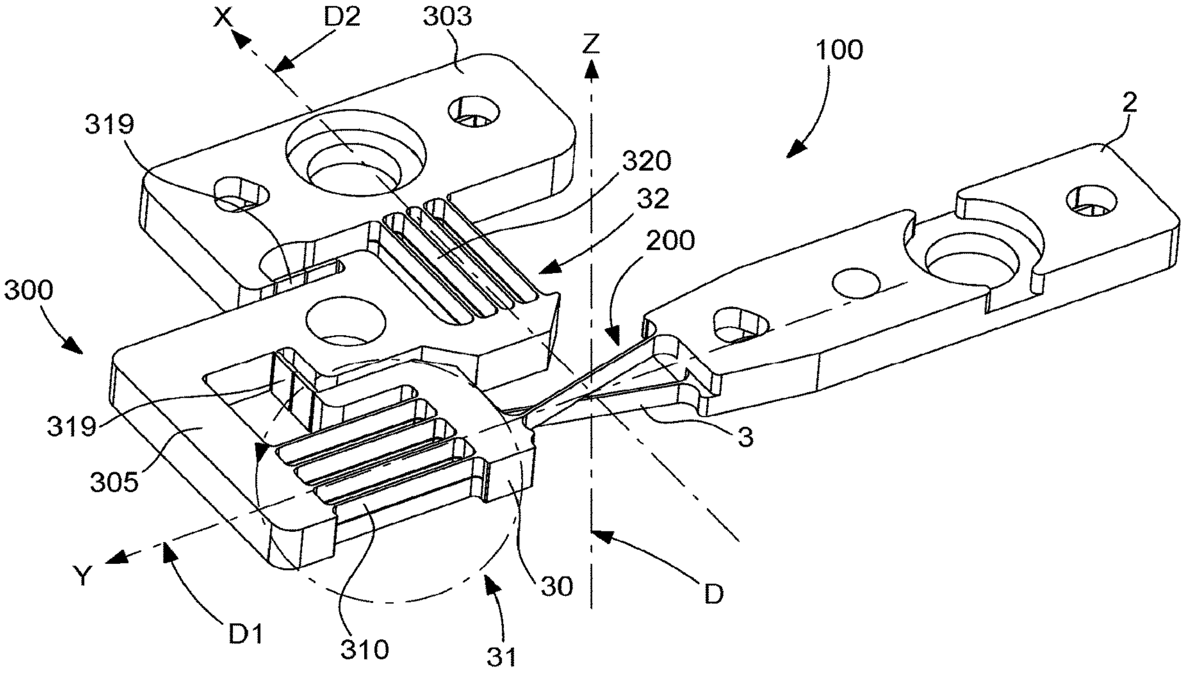
FIG. 4 shows, in a similar manner to FIG. 2, a mechanism similar to that in FIG. 1, comprising two translation stages with rectilinear elastic strips, on two superimposed and parallel levels.
Figure 5:
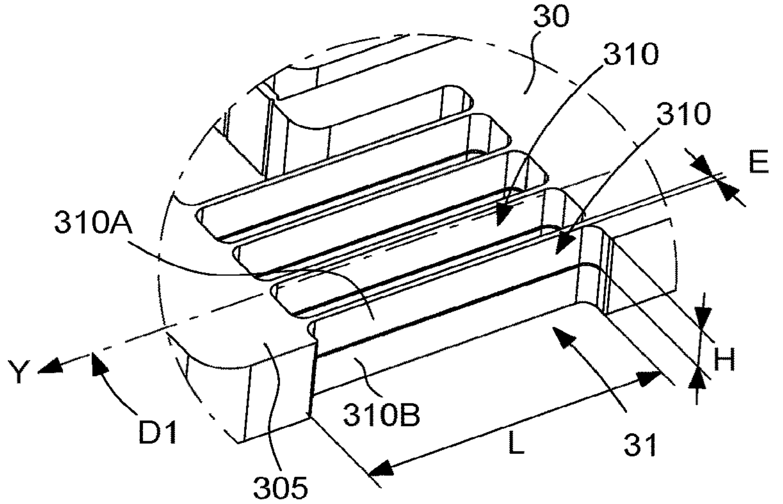
FIG. 5 diagrammatically shows a perspective view of a feature of the alternative embodiment in FIG. 4, showing such a translation stage with rectilinear elastic strips, on two superimposed and parallel levels.
Figure 6:
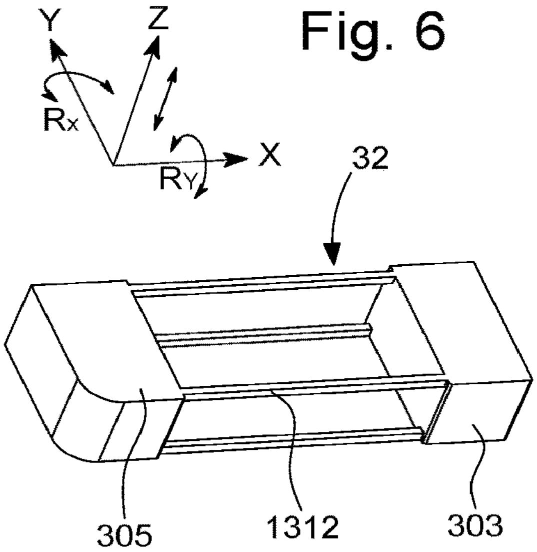
FIG. 6 shows, in a similar manner to FIG. 5, another alternative embodiment of a similar mechanism, but whose translation stages comprise rectilinear flexible rods with a substantially square cross-section.
Figure 7:
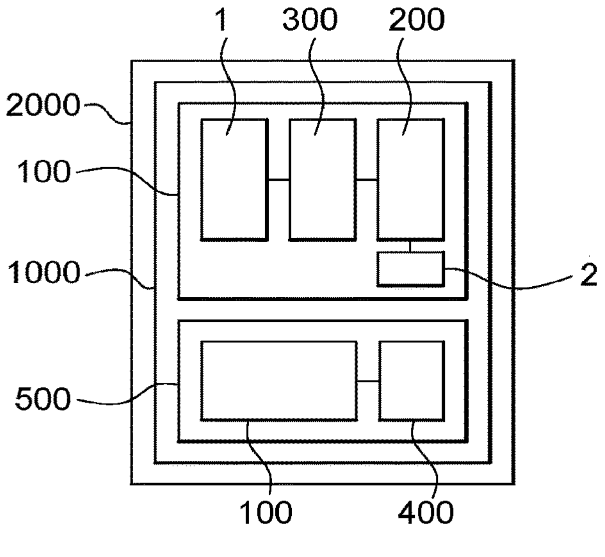
FIG. 7 is a block diagram showing a watch comprising a movement comprising, on the one hand, such a resonator mechanism, and on the other hand, an oscillator mechanism comprising such a resonator mechanism.

More particularly, the transverse translation stage 32 comprises at least two transverse flexible strips or rods, parallel to one another and of the same length. FIGS. 1 and 4 show a non-limiting alternative embodiment with four parallel transverse strips, and, more particularly, each consisting of two half-strips arranged on two superimposed levels, and extending in the continuation of one another in the first direction Z. These half-strips can either be completely free from one another, or made integral with one another by bonding or the like, or by $SiO_2$ growth in the case of a silicon construction, or the like. Naturally, the longitudinal translation stage 31, where present since it is optional, can follow the same construction principle. FIG. 6 shows an alternative embodiment with flexible rods, grouped into two levels of two rods, with a substantially square cross-section; another alternative embodiment comprises circular flexible rods. The number, disposition, and cross-section of these strips or rods can vary without departing from the scope of the present invention.

More particularly, the transverse strips or rods of the transverse translation stage 32 have a first plane of symmetry, which is parallel to the transverse axis D2, and which passes through the pivot axis D.

More particularly, the transverse strips or rods of the transverse translation stage 32 have a second plane of symmetry, which is parallel to the transverse axis D2, and orthogonal to the pivot axis D.

More particularly, the transverse strips or rods of the transverse translation stage 32 have a third plane of symmetry, which is perpendicular to the transverse axis D2, and parallel to the pivot axis D.

More particularly, the transverse strips or rods of the transverse translation stage 32 extend over at least two levels parallel to one another, each level being perpendicular to the pivot axis D.

More particularly, the arrangement of the transverse strips or rods of the transverse translation stage 32 is identical on each level.

More particularly, the rectilinear flexible rods or transverse strips 320 are flat strips whose height is at least five times greater than their thickness.

More particularly, the rectilinear flexible rods or transverse strips 320 are rods with a square or circular cross-section, whose height is equal to their thickness.

More particularly, the longitudinal translation stage 31 comprises at least two longitudinal flexible strips or rods, parallel to one another and of the same length.

More particularly, the longitudinal strips or rods of the longitudinal translation stage 31 have a first plane of symmetry, which is parallel to the longitudinal axis D1, and which passes through the pivot axis D.

More particularly, the longitudinal strips or rods of the longitudinal translation stage 31 have a second plane of symmetry, which is parallel to the longitudinal axis D1, and orthogonal to the pivot axis D.

More particularly, the longitudinal strips or rods of the longitudinal translation stage 31 have a third plane of symmetry, which is perpendicular to the longitudinal axis D1, and parallel to the pivot axis D.

More particularly, the transverse strips or rods of the longitudinal translation stage 31 extend over at least two levels parallel to one another, each level being perpendicular to the pivot axis D.

More particularly, the arrangement of the transverse strips or rods of the longitudinal translation stage 31 is identical on each level.

More particularly, the rectilinear flexible rods or longitudinal strips 310 are flat strips whose height is at least five times greater than their thickness.

More particularly, the rectilinear flexible rods or longitudinal strips 310 are rods with a square or circular cross-section, whose height is equal to their thickness.

In particular, the resonator mechanism 100 comprises axial stop means comprising at least a first upper axial stop and a second lower axial stop to limit the translational travel of the inertial element 2 at least in the first direction Z, the axial stop means being arranged to cooperate in abutment with the inertial element 2 for protecting the longitudinal strips 3 at least from axial impacts in the first direction Z, and the second plane of symmetry is substantially at an equal distance from the first axial stop 7 and from the second axial stop 8.

In one specific alternative embodiment, the resonator mechanism 100 comprises a plate attached to or in one piece with the structure 1, comprising at least one flexible strip 302 extending in a plane perpendicular to the pivot axis D and attached to the first intermediate mass 303, and which is arranged to allow the first intermediate mass 303 to move in the first direction Z. More particularly, the plate 301 comprises at least two such coplanar flexible strips. However, such a plate 301 is optional if the height of the strips of the XY translation stages is small compared to the height of the flexible strips 3, in particular less than one third of the height of the flexible strips 3, and in particular if these translation stages comprise flexible rods as shown in FIG. 6.

As explained hereinabove, the technology used in the manufacturing process allows two separate strips to be obtained in the height of a silicon wafer, which enhances the torsional flexibility of the stage without making it more flexible for translation. Furthermore, the resonator mechanism 100 can thus advantageously comprise at least two superimposed elementary assemblies, which each group together one level of the anchor unit 30, and/or of a base of the at least one inertial element 2, and of the flexure pivot 200 or of the flexible suspension 300, which always form a composite assembly, and/or of the first intermediate mass 303, and/or of the transverse translation stage 32, and/or of a breakable element used only during the assembly and destroyed before the oscillator is commissioned; each elementary assembly can be assembled with at least one other elementary assembly by bonding or the like, by mechanical assembly, or by $SiO_2$ growth in the case of a silicon construction, or the like.

More particularly, such an elementary assembly further comprises at least one level of the second intermediate mass 305 and/or of the longitudinal translation stage 31.

The invention further relates to a horological oscillator mechanism 500 comprising such a horological resonator mechanism 100, and an escapement mechanism 400, arranged to cooperate with one another.

The invention further relates to a horological movement 1000 comprising at least one such oscillator mechanism 500 and/or at least one resonator mechanism 100.

The invention further relates to a watch 2000 comprising at least one such movement 1000 and/or at least one oscillator mechanism 500 and/or comprising at least one such resonator mechanism 100.

The invention claimed is:

1. A horological resonator mechanism, comprising a structure and an anchor unit from which is suspended at least one inertial element which is arranged to oscillate with a first degree of rotational freedom RZ about a pivot axis extending in a first direction Z, said inertial element being subjected to return forces exerted by a flexure pivot comprising a plurality of substantially longitudinal elastic strips, each fixed at a first end to said anchor unit, and at a second end to said inertial element, each said elastic strip being deformable essentially in a plane XY perpendicular to said first direction Z, wherein said anchor unit is suspended from said structure by a flexible suspension, which is arranged to allow said anchor unit to move in five flexible degrees of freedom of the suspension which are a first degree of translational freedom in said first direction Z, a second degree of translational freedom in a second direction X orthogonal to said first direction Z, a third degree of translational freedom in a third direction Y orthogonal to said second direction X and to said first direction Z, a second degree of rotational freedom RX about an axis extending in said second direction X, and a third degree of rotational freedom RY about an axis extending in said third direction Y, and wherein said resonator mechanism is a composite assembly made of at least two different materials, and which comprises said flexure pivot, which is made of a first material wherein a first Young's modulus E1 and by a first yield strength Sigma 1 and by a first modulus of rigidity G1, and, said resonator mechanism further comprising said flexible suspension, which is made of a second material wherein a second Young's modulus E2 and by a second yield strength Sigma 2 and by a second modulus of rigidity G2.

2. The resonator mechanism according to claim 1, wherein the value of said second modulus of rigidity G2 is greater than ten times the value of said first modulus of rigidity G1.

3. The resonator mechanism according to claim 1, wherein the ratio Sigma 2/E2 is at least twice the ratio Sigma 1/E1.

4. The resonator mechanism according to claim 1, wherein the value of said first Young's modulus E1 is greater than or equal to 1.5 times the value of said second Young's modulus E2.

5. The resonator mechanism according to claim 1, wherein the value of said second yield strength Sigma 2 is greater than or equal to 1.5 times the value of said first yield strength Sigma 1.

6. The resonator mechanism according to claim 1, wherein said at least one inertial element is integral with said flexure pivot.

7. The resonator mechanism according to claim 1, wherein said flexible suspension is integral with said structure.

8. The resonator mechanism according to claim 1, wherein said flexure pivot is capable of being removed from said flexible suspension.

9. The resonator mechanism according to claim 1, wherein said flexible suspension comprises clamping elements to immobilise said flexure pivot.

10. The resonator mechanism according to claim 1, wherein said flexible suspension comprises at least one pocket capable of receiving adhesive to immobilise said flexure pivot.

11. The resonator mechanism according to claim 1, wherein the junction between said flexible suspension and said flexure pivot is made on said anchor unit.

12. The resonator mechanism according to claim 1, wherein the ratio Sigma 2/E2 is at least three times the ratio Sigma 1/E1.

13. The resonator mechanism according to claim 1, wherein said first material is silicon and/or a silicon oxide.

14. The resonator mechanism according to claim 1, wherein said second material is nickel-phosphorus NiP.

15. The resonator mechanism according to claim 1, wherein said flexible suspension comprises, between said anchor unit and a first intermediate mass, which is attached to said structure directly or with a plate that is flexible in said first direction Z, a transverse translation stage with flexure bearing and comprising transverse strips or transverse flexible rods, which are rectilinear and extend in said second direction X and symmetrically about a transverse axis intersecting said pivot axis.

16. The resonator mechanism according to claim 15, wherein said flexible suspension comprises, between said anchor unit and a second intermediate mass, a longitudinal translation stage with flexure bearing, and comprising longitudinal strips or longitudinal flexible rods, which are rectilinear and extend in said third direction Y and symmetrically about a longitudinal axis intersecting said pivot axis, and comprises said transverse translation stage between said second intermediate mass and said first intermediate mass.

17. The resonator mechanism according to claim 16, wherein said longitudinal axis intersects said transverse axis.

18. The resonator mechanism according to claim 15, wherein said longitudinal translation stage and said transverse translation stage each comprise at least two said flexible strips or rods, wherein each said strip or rod comprises its thickness in said second direction X when said strip or rod extends in said third direction Y or conversely, by its height in said first direction Z and by its length in the direction wherein said strip or rod extends, said length being at least five times greater than said height, said height being at least as great as said thickness.

19. A horological movement comprising at least one resonator mechanism according to claim 1, and an escapement mechanism, which are arranged to cooperate with one another.

20. A watch comprising at least one movement according to claim 19.

* * * * *